United States Patent [19]

Kitamoto et al.

[11] 3,913,131

[45] Oct. 14, 1975

[54] METHOD OF MAGNETIC CONTACT DUPLICATION USING TEMPORARY REDUCTION IN COERCIVITY OF MASTER

[75] Inventors: Tatsuji Kitamoto; Mahito Shimizu; Masaaki Fujiyama; Goro Akashi, all of Odawara, Japan

[73] Assignee: Fuji Photo Film Co., Ltd., Minami-ashigara, Japan

[22] Filed: June 8, 1973

[21] Appl. No.: 368,435

[30] Foreign Application Priority Data

June 9, 1972 Japan ............................... 47-57396

[52] U.S. Cl. .................................. 360/17; 179/100

[51] Int. Cl. ............................................ G11b 5/86

[58] Field of Search .......... 179/100.2 E; 360/16, 17

[56] References Cited

UNITED STATES PATENTS 3,465,105 9/1969 Kumada et al. ............. 179/100.2 E

*Primary Examiner*—Bernard Konick

*Assistant Examiner*—R. S. Tupper

*Attorney, Agent, or Firm*—Sughrue, Rothwell, Mion, Zinn & Macpeak

[57] ABSTRACT

Video records on a master tape are copied onto a slave tape which is put in contact with the master tape. The master tape includes a magnetic material the coercive force of which increases significantly at low temperature, for example, Co-doped $\gamma$-$Fe_2O_3$ or $Fe_3O_4$, and the slave tape includes a magnetic material the coercive force of which does not change significantly. The video records on the master tape are made at room temperature or above, and then the copying process is practised at a low temperature, i.e., at which the coercive force of the master tape is 2.5 to 3 times higher than that of the slave tape. Thus, high density records such as video records are effectively copied.

1 Claim, 3 Drawing Figures

METHOD OF MAGNETIC CONTACT DUPLICATION USING TEMPORARY REDUCTION IN COERCIVITY OF MASTER

BACKGROUND OF THE INVENTION

1. Field of the Invention

This invention relates to a method of magnetic copying, particularly to a method for copying magnetic signals recorded on a magnetic recording tape. In detail, this invention relates to a method for copying video programs in which video signals recorded on a master tape having a high coercive force are copied onto a slave tape having a low coercive force by means of contacting these tapes and then applying thereto an A.C. magnetic field. Copying in accordance with the present invention is, of course, generally conducted with the magnetic layer of the master and the magnetic layer of the slave tape in face to face physical contact.

2. Description of the Prior Art

As a video tape, in general, there is used a tape having a coercive force of about 300 oersteds and a relatively smooth surface for recording signals in the frequency range from 4 to 5 MHz. High density recording video tape, which has recently been used in video cassettes or video cartridges, has a coercive force of about 500 oersteds so that its output of 5 MHz is increased by 5 to 6 db in comparison with conventional tapes having a coercive force of 300 oersteds.

The heretofore mentioned magnetic copying method is used for copying video program onto a number of such video tapes. However, it is known that the master tape for this purpose has to have a coercive force of 2.5 to 3 times than of the slave tape, that is, a tape having a coercive force of 800 to 900 oersteds must be used for magnetic copying onto a conventional video tape having a coercive force of 300 oersteds. Furthermore, in order to magnetize a tape having a coercive force of 800 to 900 oersteds, it is impossible to use a conventional video tape recorder and therefore a special video tape recorder must be used.

Though it is desirable to use a high density video tape of 500 oersteds in order to obtain good picture quality in video records copied on a slave tape, it would be necessary to use a master tape having a coercive force of more than 1250 to 1500 oersteds according to the prior art. To magnetize such a high coercive force tape and record a video program thereonto, it would be necessary to prepare a head material and bias current source which would produce an effective magnetic field of 3000 to 5000 gauss. However, it is extremely difficult to produce such a magnetic field at a high frequency of 4 to 5 MHz in accordance with the prior art, or a special tape recorder would be prohibitively expensive if it were possible to make such, and accordingly such a recorder will not be in practical use in the near future.

SUMMARY OF THE INVENTION

This invention was made with the intention of overcoming the above difficulties.

It is, therefore, one object of this invention to provide a new method for copying video programs onto a magnetic tape having a coercive force of preferably 300 to 500 oersteds.

It is another object of this invention to provide a master tape suitable for the copying of video signals onto a magnetic video tape having a coercive force of preferably 300 to 500 oersteds, without the use of any specially prepared video tape recorder.

Accordingly, it is a further object of this invention to provide a new method for the copying of magnetic high density records onto every type of magnetic recording medium.

For these purposes, we the inventors turned our attention to the fact that iron oxide ($\gamma$-$Fe_2O_3$ and $Fe_3O_4$) containing cobalt has a high coercive force, depending on the cobalt content, and the coercive force increases remarkably near 0°C. Applying this phenomenon, it is possible to use a video tape for recording at room temperature or above, e.g., 30° to 50°C, so that the tape has a relatively low coercive force of preferably 300 to 500 oersteds, and to use it for copying at a cooler temperature, e.g., below 10°C, so that it has a high coercive force of, e.g., 800 to 1300 or more oersteds.

The copying process can be practised by means of using, e.g., $\gamma$-$Fe_2O_3$ tape with coercive force(Hc) of 300 oersted(Oe), $CrO_2$ tape with Hc of 400 to 500 Oe or an alloy tape with an Hc of more than 300 Oe as a slave tape and applying an A.C. magnetic field thereto.

DETAILED DESCRIPTION OF THE EMBODIMENTS OF THE INVENTION

Figures 1, 2, 3:
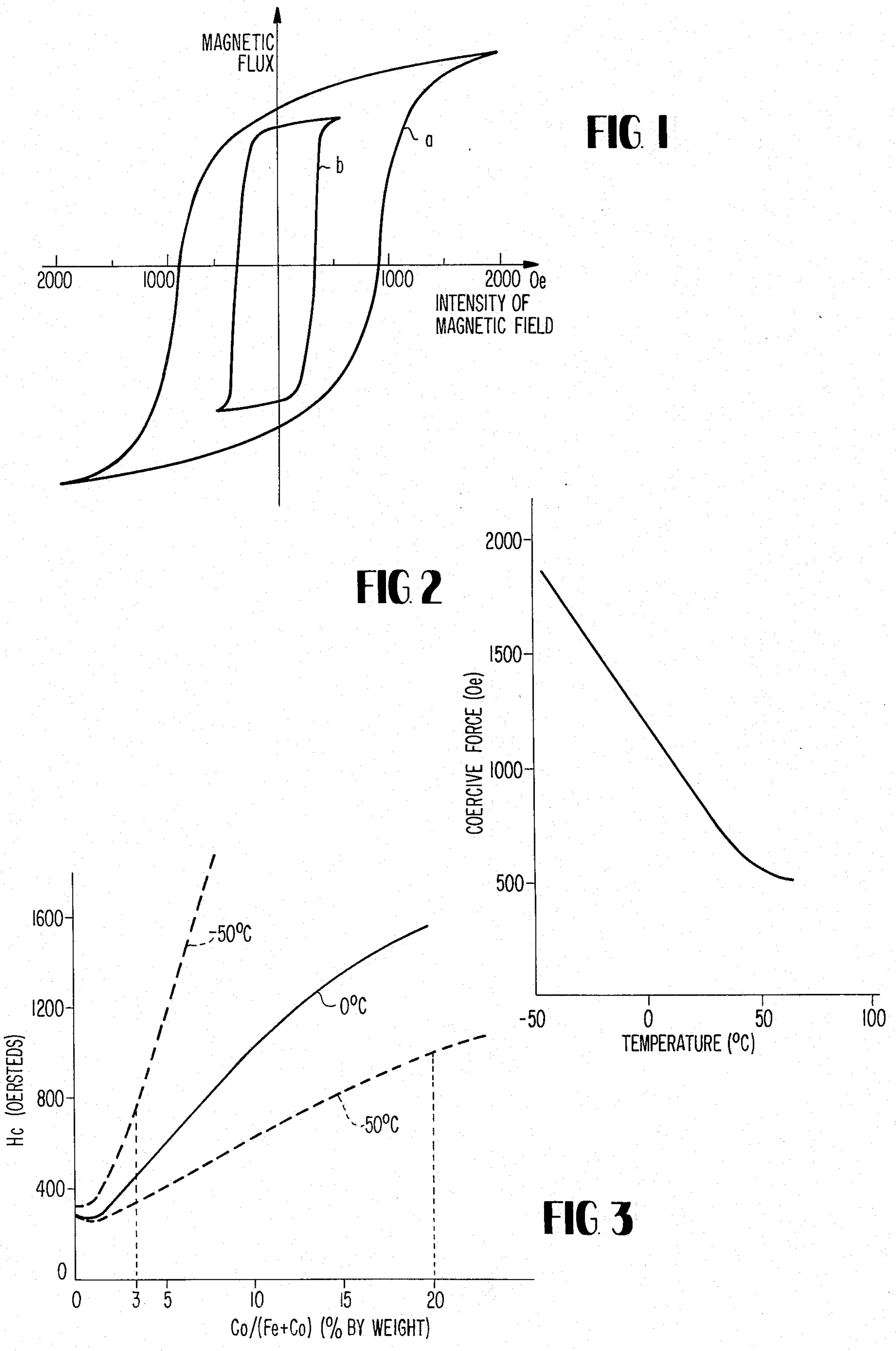
FIG. 1 shows the hysteresis curve (a) of a master tape having coercive force of 800 to 900 oersteds and the hysteresis curve (b) of a slave tape having a coercive force of 300 oersteds.
FIG. 2 shows the temperature-coercive force relation of cobalt-doped $\gamma$-$Fe_2O_3$.
FIG. 3 is plot of coercive force versus the percentage of cobalt in a cobalt doped ferrite system with changes in temperature.

A magnetic tape of $\gamma$-$Fe_2O_3$ containing 7.5% cobalt which is used as a master tape has a coercive force of 800 oersteds at room temperature as shown in FIG. 1, and shows a coercive force of 550 oersteds at 50°C, 1200 oersteds at 0°C, 1350 oersteds at −10°C and 1780 oersteds at −40°C, as shown in FIG. 2.

We, the inventors, preformed the following experiments using the combinations of the above master tape and one of three sorts of slave tapes: $\gamma$-$Fe_2O_3$ tape with a coercive force(Hc) of 300 oersteds(Oe); $CrO_2$ tape with an Hc of 500 Oe and Fe-Co alloy tape with an Hc of 700 Oe.

The Hc of the master tape is 800 Oe at room temperature, but at the time of copying at −40°C is about 1780 Oe. This, of course, is about 2.5 times as great as that of the alloy slave tape Hc value of 700 Oe.

In the experiments, in order to make a video recording on the master tape, a video tape recorder for video cassettes enabling video recording onto a tape having coercive force of about 500 oersteds, such as $CrO_2$ tape, was used to make an inverted image recording, and a specially made video tape recorder for master tapes having a coercive force of about 900 oersteds was also used.

The copying process was practised according to the double-layer-take-up method, that is, the master tape and one of the slave tapes were contacted with other's magnetizable face to magnetizable face and taken up, keeping the double layer in contact onto a reel, and then an attenuating A.C. magnetic field was applied with an intensity twice that of the coercive force of the slave tape so as to perform copying. In order to examine the copying effects, the output of the slave tape at 5 MHz was measured in comparison with a standard in which the directly reproduced output of the $\gamma$-$Fe_2O_3$ tape was 0 db.

The measured datum is shown in the following Tables.

TABLE 1

(Video records were made with the use of VTR for cassette at 50°C)

| slave tape | copying at 25°C | copying at 0°C | copying at −10°C | copying at −40°C |
|---|---|---|---|---|
| $\gamma$-$Fe_2O_3$ (Hc:300 Oe) | −2 db | −2 db | −2 db | −2 db |
| $CrO_2$ (Hc:500 Oe) | −3 db* | +3 db | +3.5 db | +4.0 db |
| Fe-Co alloy (Hc:700 Oe) | −10 db* | −2 db* | +5 db | +6.0 db |

(In the case marked *, the output of the master tape was partially demagnetized.)

$\gamma$-$Fe_2O_3$ tape: ferromagnetic $\gamma$-$Fe_2O_3$ (avg. particle size 0.5 × 0.1 × 0.1 micron) used. (Hc ca. 300 Oe)

$CrO_2$ tape: ferromagnetic $CrO_2$ (avg. particle size 0.6 × 0.1 × 0.1 micron) used. (Hc ca. 500 Oe)

Fe-Co alloy tape: ferromagnetic alloy particles obtained by the hydrogen reduction of the oxalate used. (Hc ca. 700 Oe)

Co doped $\gamma$-$Fe_2O_3$ tape: Co (3 – 20 wt %) doped $\gamma$-$Fe_2O_3$ used. (Hc ca. 800 Oe)

See Japanese Patent Publication 5482, 1973.

TABLE II (Video records were made with the use of a specially made VTR at room temperature)

| slave tape | copying at 0°C | copying at −10°C | copying at −40°C |
|---|---|---|---|
| $\gamma$-$Fe_2O_3$ (Hc:300 Oe) | −2.5 db | −2.3 db | −2.0 db |
| $CrO_2$ (Hc:500 Oe) | +4 db | +4 db | +4 db |
| Fe-Co alloy (Hc:700 Oe) | −2 db | +5 db | +6.0 db |

In addition, though we, the inventors, tried to practise copying at room temperature according to the prior method onto a $CrO_2$ tape with an Hc of 500 oersteds and a Fe-Co tape of 700 oersteds, the master tape demanded a coercive force of 1250 to 1500 oersteds and 1750 to 2100 oersteds in these respective cases, and accordingly it was practically impossible to make video records on the master tape.

As apparent from the above description, it is possible according to this invention to use a slave tape having a high coercive force so that it is impossible to obtain a high copied video output from the slave tape. That is, the video output obtained from a copy tape according to this invention is 5 to 7 db higher than that obtained by prior methods. Thus, it should be apparent that this invention holds a remarkably high industrial value.

Though the above description of this invention was given mainly for a master tape for copying a video tape, it is, of course, possible to use the copying method of this invention for the copying of high density records corresponding to the record density of video tape, on magnetic tape, magnetic sheets or magnetic disks.

Further, it will be seen by one skilled in the art that a great amount of discussion has been offered in the preceeding material on the temperatures used. In this regard, it must be appreciated that the most commonly used magnetic recording material support is polyethylene terephthalate, which has a heat transformation temperature of about 150°C. This is relatively low, and balancing this temperature against the substantive technical consideration of magnetic recording per se, the recording of the magnetic material whose coercive force increases as the temperature is lowered is preferably performed at a temperature of about 50°C or less, and the "cooled" printing is preferably performed at a temperature down to about −40°C. In the range of from about −40°C to about 50°C, a material whose Hc changes greatly can be used as a master tape and a material whose Hc does not change greatly can be used as a slave tape.

It will be noted by one skilled in the art that the master and slave tapes described above have been primarily in terms of a rather limited coercive force range, e.g., in the above the most commonly used coercive force range was from about 300 oersteds to about 500 oersteds. This is the most preferred embodiment of the present invention. However, the present invention is not limited to slave tapes having a coercive force (Hc) of about 300 to about 500 oersteds.

As a matter of fact, many kinds of slave tapes can be used in the present invention. Representative of these slave tapes are those which have coercive forces (Hc) as follows:

| Ferromagnetic powder | Coercive force (Hc) (at room temp.) |
|---|---|
| $\gamma$-$Fe_2O_3$ | 200 – 400 Oe |
| $Fe_2O_3$ | 200 – 400 Oe |
| $CrO_2$ | 200 – 700 Oe |
| Fe,Co,Ni, alloys (e.g., combinations of Fe-Co, Fe-Ni, Ni-Co, Fe-Co-Ni) | 200 – 1500 Oe |
| Fe,Co,Ni alloys which contain P,B,N,C,Cu,Mn,Zn,Cr etc. plated or vacuum evaporated Co-P, Co-Ni-P, Fe, Co, Fe-Co-Ni | 200 – 1000 Oe |

It will be seen that the lowest Hc value in the above is in the area of 200 Oe, but this is merely provided because it is a commercially practical low limitation on a tape which requires high recording density, such has a video tape.

On the other hand, the higher Hc values are in the area of 400–1500 Oe. Again, this is not a substantive limitation on the invention, rather, the upper value of 1500 Oe is near the maximum Hc value which is easily obtained on a large commercial scale using available modern techniques. It will thus be understood by one skilled in the art that the above values are not limitative. The values presented in the above table are Hc values at room temperature.

In a manner similar to the slave tapes, the master tapes heretofore discussed in detail are only preferred master tapes used in the present invention. However, in accordance with the essential concepts of the present invention, all ferromagnetic materials with a high coercive force due to crystalline anisotropy can be used. Cobalt doped $Fe_3O_4$ or other such ferrite materials containing other ferromagnetic metals such as Mn, Cr, Cu or Zn can be used with success in the present invention, and according to the crystal magnetic anisotropy due to the cobalt ions, they generally have high Hc in proportion to the amount of cobalt added (for example $\gamma$-$Fe_2O_3$ or $Fe_3O_4$ at 20% Co (wt%, Co/Co+Fe), Hc is above about 1,000 Oe; at 3% Co., Hc is about 750 Oe (at 50°C)). However, this magnetic anisotropy tends to disappear at temperature areas as shown in FIG. 2. Accordingly, as will be clear from FIG. 2, any master tape which has the characteristic of a rapidly increasing Hc value at lower temperatures is preferred.

Among such master tapes, most preferred are cobalt doped $\gamma$-$Fe_2O_3$, cobalt doped $Fe_3O_4$ (which have a relatively high magnetization strength per unit weight) which optionally can be substituted by Mn, Cu, Zn, etc.

In addition to the above discussed cobalt doped ferrites, Mn Bi, BaO·6 $Fe_2O_3$ and the like can be used as materials whose Hc value increases rapidly when the temperature is lowered. These are not, preferred, however, for their Hc value at room temperature is usually less than about 1200 Oe (a general recorder can record in this range, however). They can be used, however, with success as a master tape if the support is not a plastic film but a metal, such as aluminum.

Thus, the invention is of general application to master tapes whose Hc can be increased at the time of slave recording with varying the temperature, and the cobalt doped ferrites are only preferred amoung such materials, and $\gamma$-$Fe_2O_3$ or $Fe_3O_4$ doped 3–20% cobalt, which can be substituted with P, B, N, C, Cu, Mn, Zn or Cr form a most preferred class, i.e., 3–20 wt% Co/Co+Fe. For example, such substituted materials as are contemplated in the present invention would usually be those wherein one part of the ferrite is substituted by one of these metals, for instance, $Fe_2O_3$ substituted with Cu to $Fe_2CuO_3$.

The most preferred master tapes/slave tape combinations used in the present invention are those where the Hc of the master tape is about 2.5 to about 3 times the Hc of the slave tape at slave tape printing. For example, with a slave tape of an Hc of 500 Oe one would not use a master tape of an Hc value of 1,100, but would generally use a value of about 1200 Oe ($\pm$ about 50 Oe is permissable in general with the 2.5–3.0 preferred difference). This range is selected considering the characteristics of conventional slave tapes. For instance, a conventional video tape has an Hc of about 300 Oe, high density video tape has an Hc of about 500 Oe and super high density video tape has an Hc of about 1000 Oe. All of these can be used in the present invention. To slave these tapes, a high Hc master tape is required, i.e., the master tape should have an Hc of about 2.5 to about 3 times as large as the Hc of the slave tape involved, that is, 750 to 900 Oe, 1250 to 1500 Oe and 2500 to 3000 Oe, respectively. Recorders can record these three kinds of tapes, though with an Hc of 1000 modern equipment is required.

In order to achieve best results in accordance with the present invention, it is highly preferred that the coercivity of the master tape at slave copying by 20% greater or more than the coercivity of the master tape at initial recording. Needless to say, as one skilled in the art would appreciate, the general rule in this regard, within common sense limits, is the higher the coercivity change the better.

Many master tapes which can be used in the present invention are disclosed in IEEE Transactions on Magnetics, Vol. MAG. 5, No. 3, pages 437 to 441 (1969) published by the Institute of Electrical and Electronic Engineers, Inc. A detailed discussion on the types of magnetic fields and the intensity as is used for master/slave recording is provided in the article by H. Sugaya in this text, titled "Magnetic Tape Reproduction by Contact Printing at short Wave Lengths". This article applies fully to the present invention.

While the invention has been described in detail and with reference to specific embodiments thereof, it will be apparent to one skilled in the art that various changes and modifications can be made therein without departing from the spirit and scope thereof.

What is claimed is:

1. A method for copying magnetic signals on a high density video magnetic recording medium having a magnetic recording layer of a magnetic material, the coercive force of which is between the range of 200 and 1500 oersteds and which is substantially constant with temperature, comprising:

making a master magnetic video record at room temperature to about 50°C on a high density video magnetic recording medium having a magnetic recording layer of magnetic material, the coercive force of which increases rapidly with decreasing temperature and has a value of between 2.5 and 3 times the coercive force of the recording medium on which the high frequency magnetic signals are to be copied at a temperature down to about −40°C, the increase in coercive force of the magnetic material of the master magnetic video record at −40°C being at least 20 percent greater than its coercive force at the temperature at which the master magnetic video record is made, cooling said master magnetic video record to a temperature down to about −40°C, placing the video magnetic recording medium on which the high frequency magnetic signals are to be copied in contact with said master magnetic video record, and subjecting the contacted recording medium and master record to a magnetic transfer field so as to accomplish magnetic copying at said temperature.

* * * * *